Dec. 27, 1966   R. J. HOLTON   3,293,709
CLAMP DEVICE

Filed Oct. 23, 1964   3 Sheets-Sheet 1

INVENTOR.
ROBERT J. HOLTON
BY
*Jere, Fetzer & Beare*
ATTORNEYS

Dec. 27, 1966     R. J. HOLTON     3,293,709
CLAMP DEVICE

Filed Oct. 23, 1964     3 Sheets-Sheet 2

INVENTOR.
ROBERT J. HOLTON

BY
*Tears, Fetzer & Tears*
ATTORNEYS

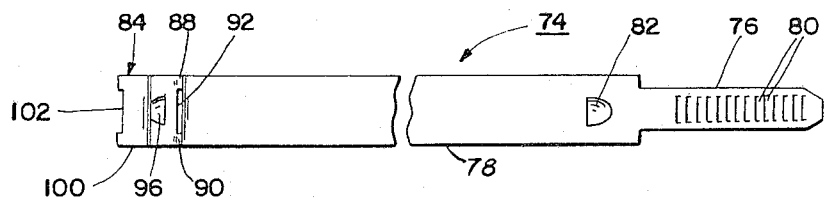
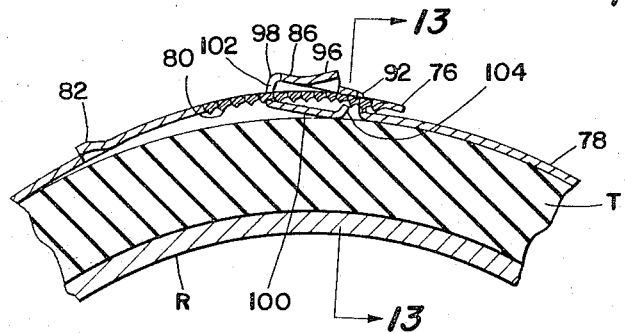
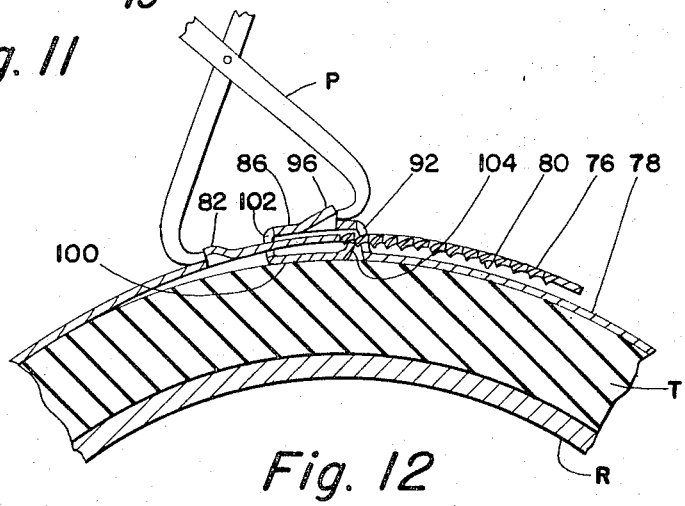
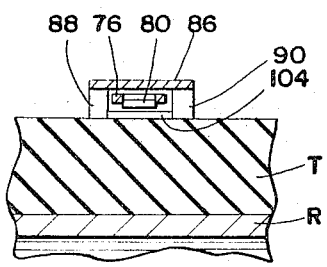

United States Patent Office 3,293,709
Patented Dec. 27, 1966

3,293,709
CLAMP DEVICE
Robert J. Holton, Rocky River, Ohio, assignor to Tinnerman Products, Inc., a corporation of Ohio
Filed Oct. 23, 1964, Ser. No. 406,118
7 Claims. (Cl. 24—20)

This invention relates to clamp devices and more particularly to an improved clamp device for securing a flexible tubing, such as a hose or the like, to a more rigid article, such as a conduit, pipe, tube or the like.

Difficulties have heretofore arisen in such applications due to the tendency for the flexible material of the tubing to distort or stretch upon tightening of the clamp and, hence, to result in a loosening of the connection. Heretofore, various types of latch as well as nut and/or bolt arrangements have been proposed, but such arrangements have not proven satisfactory due to the expense encountered in the production and assembly, and particularly due to the inability of such heretofore known arrangements to remain in assembled position while maintaining a constant and uniform clamping action on the tubing.

Accordingly, it is an object of the present invention to provide an improved clamp device which is of a simple, yet rugged construction for effectively and tightly clamping a flexible tubing, such as a hose or the like, to another more rigid article.

Another object of the present invention is to provide a clamp device of the character described which can be readily and economically produced; and which can be quickly assembled and tightened about the flexible tubing without the need for additional attachments to maintain the connection.

A further object of the present invention is to provide an improved clamp device of the character described, which upon tightening thereof, automatically maximizes upon the inherent flexibility characteristics of the material of the tubing to provide a positive and permanent interlocking coaction in the final clamped position of the device.

To the accomplishment of these and other objects of the present invention, there is provided a band of resilient sheet material which may be bent into a loop to telescopingly encircle the tubing. One end of the band includes a tongue having a plurality of ratchet teeth extending therefrom and adapted to be inserted through a raised bridge disposed adjacent the other end of the band. A resilient arm is carried by the bridge which includes projection means extending therefrom. The projection means is adapted for automatic pivotal movement into interlocking coacting engagement with selective of the ratchet teeth upon tightening of the band around the tubing, thereby to positively and permanently maintain the clamping action of the band around the tubing.

Other objects and advantages of the invention will be apparent from the following description taken in conjunction with the accompanying drawings, wherein:

FIG. 10 is a top plan view showing the bottom or inner side of another modification of the clamp device made in accordance with the present invention;

FIG. 11 is an enlarged fragmentary section view showing the modification of the clamp device of FIG. 10 in its initial clamped position around a flexible tubing;

FIG. 12 is an enlarged fragmentary section view showing a tool which may be utilized for tightening the modification of the clamp device of FIG. 11 into its final clamped position around the flexible tubing; and FIG. 13 is a fragmentary vertical section view taken along the plane indicated by the line 13—13 of FIG. 11.

Figure 1:
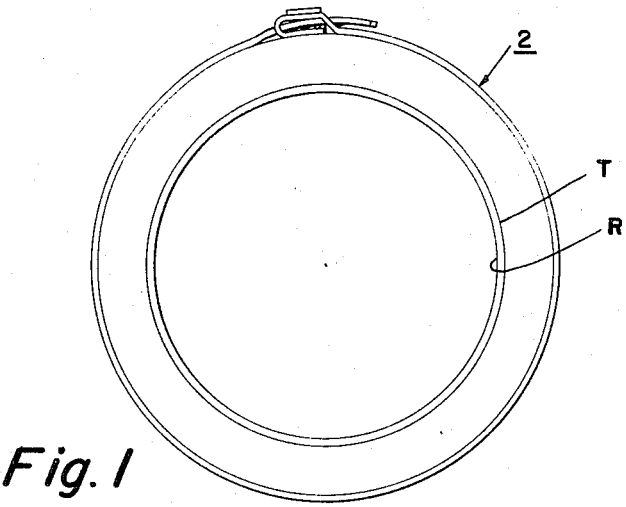
FIG. 1 is an end elevational view showing one end of a flexible tubing, such as a hose, secured to a tubular member by means of the improved clamp device of the present invention.
Figure 2:
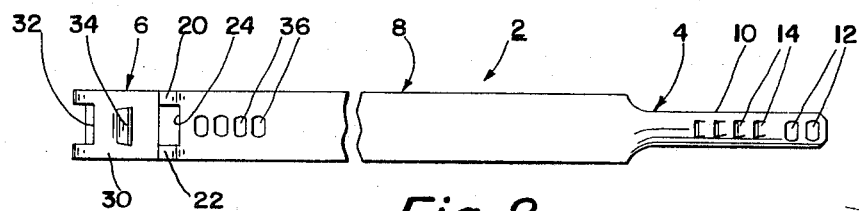
FIG. 2 is a top plan view showing the botttom or inner side of the improved clamp device removed from the flexible tubing of FIG. 1 and on a reduced scale compared to that shown in FIG. 1.

Referring now again to the drawings, FIG. 1 illustrates one of the several modified forms of the clamp device, designated generally at 2, for use in clamping a flexible tubing T, such as a rubber hose or the like, to a rigid tubing article R. Such application has very important applications in domestic, commercial and/or industrial installations, such as in connecting an automobile engine to a radiator or the like. Moreover, the clamp device 2 may readily be applied for use with various types of flexible tubing products of any desired diameter.

As best shown in FIGS. 2 to 5, inclusive, the clamp device 2 is preferably made from a continuous strip of sheet metal, such as spring steel, cold rolled metal, stainless steel or other such type of metal having spring-like characteristics. The device 2 preferably has a length somewhat greater than the circumference of the hose T to which it is to be applied, and may be conveniently referred to as having a ratchet end 4, a pawl end 6, and an intermediate band 8 connecting the two ends together.

Figure 5:
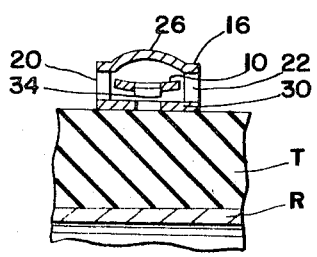
FIG. 5 is a fragmentary vertical section view taken along the plane indicated by the line 5—5 of FIG. 3.
Figure 6:
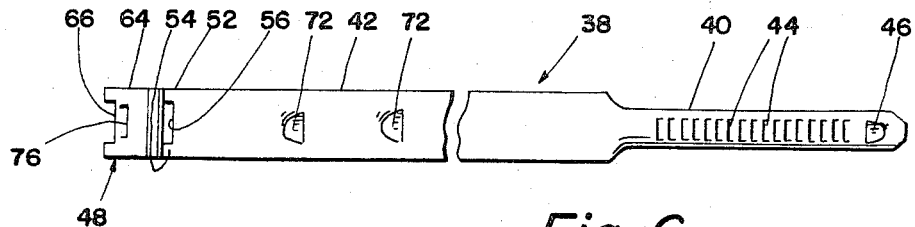
FIG. 6 is a top plan view showing the bottom or inner side of a modification of the clamp device made in accordance with the present invention.
Figure 7:
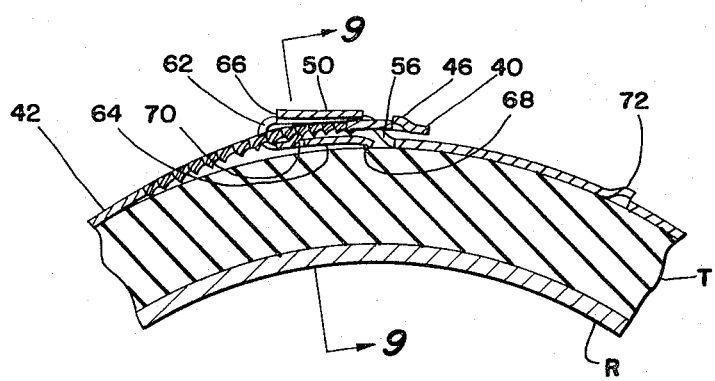
FIG. 7 is an enlarged fragmentary section view showing the modification of the clamp device of FIG. 6 in its initial clamped position around a flexible tubing.
Figure 8:
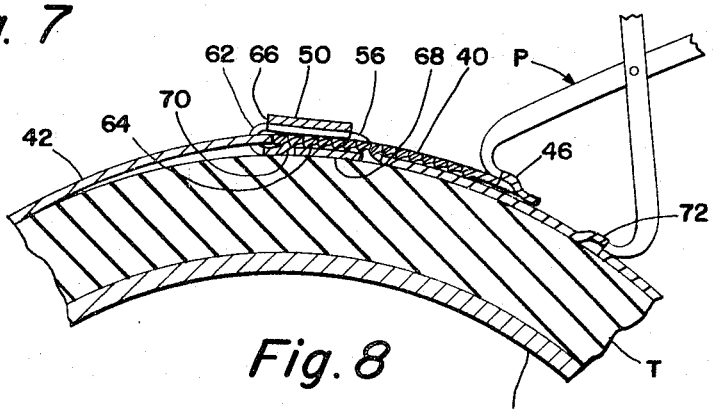
FIG. 8 is an enlarged fragmentary section view showing another type tool which may be utilized for tightening the modification of the clamping device of FIG. 6 into its final clamped position around the flexible tubing.
Figure 9:
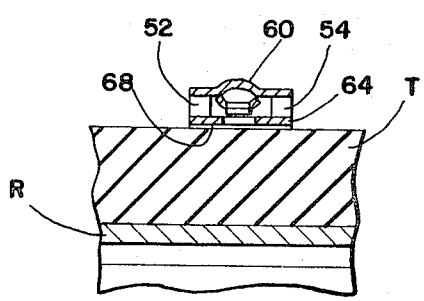
FIG. 9 is a fragmentary vertical section view taken along the plane indicated by the line 9—9 of FIG. 7.

The ratchet end 4 includes a longitudinally extending tongue 10 having a reduced transverse dimension compared to the transverse dimension of the band 8 and is of a generally arcuate, concave configuration in transverse cross-section (FIG. 5). This arcuate configuration is particularly useful in adding rigidity to the tongue and to facilitate insertion of the tongue into the pawl end 6 of the device. The tongue 10 is preferably provided adjacent its distal end with a series of spaced apertures 12 through which a suitable tool S (FIG. 4), such as a screw driver, may be inserted to tighten the device around the hose T, as will be hereinafter more fully described.

The tongue 10 may be serrated inwardly of the apertures 12 to provide a series of ratchet teeth 14 which depend downwardly therefrom. The teeth 14 are preferably inclined in a direction away from the free end of the tongue 10 for successive interlocking engagement with the pawl end 6 of the device. Though the four teeth 14 shown have been found to be a convenient number for a particular size hose, it is to be understood that the number of teeth may be increased or decreased dependent upon the particular application.

In accordance with the present invention, the pawl end 6 of the device preferably includes a cross bridge 16 which is offset upwardly from the general plane of the band 8. The bridge 16, in the embodiment shown is preferably of the same transverse dimension as the transverse dimension of the band 8. The bridge 16 has its top surface connected to the band 8 by a pair of spaced, inclined legs 20 and 22 (FIG. 2) which define therebetween an opening 24 having a dimension to slidably receive therethrough the ratchet end 4 of the device. The top surface of the bridge 16 is preferably bent upwardly and inwardly of its marginal edges to provide a concave, arc-shaped portion 26 (FIG. 5) extending longitudinally the full length thereof. Such arc-shaped construction of the bridge 16 materially strengthens its locking action and facilitates insertion of the tongue 10 beneath the bridge upon assembly thereof.

The bridge 16 is reversely bent, as at 28, to provide a return bent, resilient arm 30 which diverges slightly away from the bridge 16 so as to lie generally in the same cylindrical surface as that defined by the band 8. The arm 30 is preferably struck-out in the area of its juncture with the bridge 16 so as to provide another opening 32 having a dimension to slidably receive therethrough the tongue 10 of the ratchet end 4. The arm 30 is preferably struck-out within its margins to provide an outwardly projecting tab 34 which extends in the general direction of the aforementioned opening 24 and which is adapted to engageably coact with successive of the teeth 14 to automatically lock the teeth upon tightening of the device about the hose T, as will hereinafter be more fully described.

As in the construction of the tongue 10, the band 8 may be provided inwardly of the bridge 16 with a series of spaced apertures 36 which correspond in size to the aforementioned apertures 12 provided in the tonque for receiving therethrough the tools, as aforesaid.

Figures 3, 4:
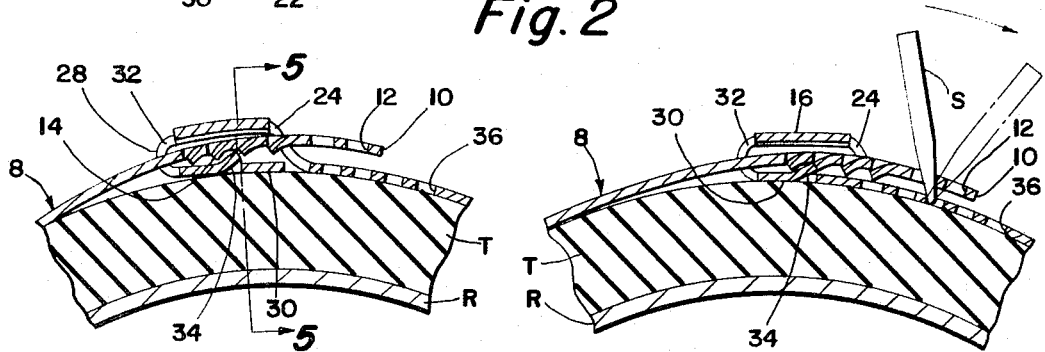
FIG. 3 is an enlarged fragmentary section view showing the improved clamp device of the present invention in its initial clamped position around the flexible tubing.
FIG. 4 is an enlarged fragmentary section view showing a tool which may be utilized for tightening the clamp device of the present invention into its final clamped position around the flexible tubing.

In application of this form of the clamp device as well as those hereinafter to be described, the ends may be separated from one another to enable the device to be applied laterally and then clamped around the hose T, or the device may be slid axially over one end of the hose, as desired. Hence, in operation, the tongue 10 may be inserted through the opening 32 and beneath the bridge 16 (FIG. 3). Upon such movement, the forwardmost of the ratchet teeth 14 cam over and pass beyond the projecting tab 34 which due to the resiliency of the arm 30 effectively acts as a detent to hold the device in a pre-clamped position around the hose T. Hence, in this pre-clamped position, one or more of similar such clamp devices may be assembled on the hose prior to being clamped into final position by means of the tools.

To achieve the final clamped position of the device, additional pressure may be applied to the tongue 10 of the ratchet end 4 by inserting the tools, of the aforementioned type, through a selected one of the apertures 12 and, hence, into engagement with one of the corresponding apertures 36 provided in the band 8. By a pivotal movement of the tool, as shown by the arrow in FIG. 4, a leverage action is applied so as to draw the tongue 10 in a circumferential tensioned relationship about the hose T. Such movement causes the rearwardmost of the ratchet teeth 14 to cam over and beyond the projecting tab 34, whereupon, due to the resiliency of the arm 30, the tab 34, in the final clamped position, will be disposed in coacting engagement against and/or between selective of the ratchet teeth 14. Hence, it can be seen that the engagement of the projecting tab 34 might be with any one of the ratchet teeth 14 dependent upon the degree of tension applied to the device for clamping the hose. Circumferential tensioning of the device causes the material of the hose T to be compressed radially inwardly which sets up a diametrically opposed counter-active force to oppose such tensioning. This counter-active force is directed against the confronting under surface of the resilient arm 30 which results in an automatic pivoting of the arm 30 upwardly in the general direction of the bridge 16. This pivotal action forces the projecting tab 34 into a further coacting engagement against and/or between successive of the ratchet teeth 14, thereby positively locking the projecting tab against and/or between successive of the teeth to prevent any shifting movement of the hose T in the final clamped position of the device.

In FIGS. 6 to 9, inclusive, there is shown a somewhat modified form of the clamp device which embodies the same general principles as hereinbefore described. In this form, the clamp device, designated generally at 38, includes a reduced tongue 40 which extends longitudinally from the band 42. The tongue 40 is serrated to provide a series of ratchet teeth 44 which depend downwardly and which are inclined to face away from the free end of the tongue to facilitate engagement with the pawl end 48 of the device. In this form, however, the tongue 40 is provided adjacent its free end with a projecting lug 46 which is adapted for engagement by a suitable tool P such as a pair of pivotal jawed pliers, FIG. 8, for exerting a tensioning pressure on the device.

The pawl end 48 of the device includes a similar type bridge 50 connected in off-set relationship from the general plane of the band 42 by a pair of spaced legs 52 and 54. Here, the legs 52 and 54 define an opening 56 through which may be inserted the reduced tongue 40. The top surface of the bridge 50 similarly includes a concave, arc-shaped portion 60 (FIG. 9) for the purposes as aforementioned.

In accordance with this form of the invention, the bridge 50 is reversely bent, as at 62, to provide a bent resilient arm 64 which diverges slightly away from the bridge 50 so as to lie in generally the same cylindrical surface as the band 42. The bridge 50 and arm 64 are struck-out in the area of their juncture to provide an opening 66 adapted to receive therethrough the tongue 40. The arm 64, however, is bent adjacent its free end to provide a downwardly and angularly outwardly extending flange 68 which is adapted to bear against the confronting outer peripheral surface of the flexible tubing T, such as the hose illustrated, in the applied position of the device. Here, the arm 64 is struck-out adjacent the opening 66 to provide a tab 70 which projects upwardly and angularly outwardly in the general direction of the opening 56 for interlocking engagement with successive of the ratchet teeth 44.

To apply tension to the device, the band 42 is preferably provided inwardly of the bridge 50 with a series of spaced lugs 72 which project upwardly therefrom. The lugs 72 are similarly adapted to be engaged by the jawed pliers P. In operation, the tongue 40 is inserted through the respective openings 56 and 66 beneath the bridge 50 so that the forwardmost of the ratchet teeth 44 cam over and beyond the propecting tab 70 wherein the tab springs upwardly into interlocking engagement with successive of the teeth to hold the device in the pre-clamped position illustrated in FIG. 9. Following this pre-clamped position, the jawed pliers P (FIG. 8) may be utilized to engage the lugs 46 and 72 by forcing them together to tension and draw the device circumferentially around the hose. Such tensioning causes the material of the hose to be compressed radially inwardly which sets up a counter-active force, the pressure of which is directed against the flange 68 to pivot the arm 64 upwardly in the general direction of the bridge 50. Such pivotal movement of the arm 64 automatically moves the tab 72 into a further positive locking engagement with selective of the rearwardmost ratchet teeth 44, thereby preventing any shifting movement of the device in its final clamped position around the hose.

In FIGS. 10 to 13, inclusive, there is illustrated another modified form of the clamp device, designated generally at 74, which is generally similar in operation to that shown in FIGS. 1 to 9. In this form the reduced tongue 76 extends longitudinally from the band 78 and is serrated to provide a series of ratchet teeth 80 which are inclined to face away from the free end of the tongue. However, in this form the band 78 is provided with a projecting lug 82 adjacent its juncture with the tongue 76 which is adapted to be engaged by a suitable tool P, such as the pivotal jawed pliers illustrated in FIG. 12.

The pawl end 84 of the device includes a similar bridge 86 connected to the band 78 by a pair of spaced legs 88 and 90 (FIG. 13) which define therebetween an opening 92 for insertion therethrough of the tongue 76. The top surface of the bridge 86 is struck-out to provide a lug 96 which is also adapted to be engaged by the tool P for tightening the device in clamped relation about a tubing T.

The bridge 86 is reversely bent, as at 98, to provide a bent arm 100 which diverges slightly away from the bridge so as to lie in generally the same cylindrical surface as the band 78. The bridge 86 and arm 100 are similarly struck-out in the area of their juncture to provide an opening 102 adapted to receive therethrough the tongue 76. In this form, however, the free end of the arm 100 is bent upwardly to provide a flange 104 which extends angularly upwardly toward and in spaced relationship from the underside of the bridge 86 for selective engagement with successive ratchet teeth 80 depending from the tongue 76.

In operation, the tongue 76 may simply be inserted through the openings 92 and 102 beneath the bridge 86 so that the forwardmost of the ratchet teeth 80 cam over and beyond the projecting flange 104 which snaps into engagement with successive of the teeth to hold the device in the pre-clamped position around the hose T, as illustrated in FIG. 11. Following this pre-clamped position, the tool P may be utilized to engage the lugs 82 and 96 to further tighten the device around the hose T. Moreover, as the device is tightened the material of the hose is compressed radially inwardly which sets up a counter-active force, the pressure of which is directed against the resilient arm 100 to pivot the flange 104 upwardly into positive interlocking engagement with selective of the rearwardmost of the ratchet teeth 80. In this final clamped position, the device is maintained in a positive and uniform tensioned condition about the hose due to the constant counter-active expansive pressure exerted on the resilient arm 100 by the material of the hose.

From the foregoing description and accompanying drawings, it can be seen that the clamping device of the present invention has the characteristics of being of a simple, unitary construction including a pawl and ratchet end for tightening the band in pre-clamped position around a flexible tubing member, such as a hose or the like. Such pawl includes a bridge arrangement which incorporates a novel resilient arm and projection means construction for automatically applying additional clamping pressure to the device in response to further tightening of the same around the tubing. The result is that the material of the tubing to which the device is to be applied actually exerts a radial counter-active pressure upon tightening of the device, thereby effectively eliminating the need for expensive and intricate latch type devices for clamping flexible tubing to more rigid tubing products.

The terms and expressions which have been used, are used as terms of description and not of limitation and there is no intention in the use of such terms and expressions of excluding any equivalents of any of the features shown or described, or portions thereof, and it is recognized that various modifications are possible within the scope of the appended claims.

I claim:
1. A clamp device comprising, a band of resilient material having a tongue adjacent one end with a plurality of spaced teeth projecting therefrom, a raised bridge adjacent the other end of said band and allowing passage thereunder of the teeth upon insertion of said tongue therethrough, a resilient arm carried by and spaced beneath said bridge so as to lie generally in the same cylindrical surface as said band, and projection means extending from said arm adapted for inward pivotal movement for automatic interlocking coacting engagement with selective of said teeth upon tightening of said band.

2. A clamp device in accordance with claim 1, wherein the band and tongue are each provided with a plurality of apertures adapted to receive therethrough a prying tool for forcibly inserting the tongue through said bridge.

3. A clamp device in accordance with claim 1, including a lug extending from said tongue and a plurality of lugs extending from said band adapted for engagement by a jawed tool for forcibly inserting the tongue through said bridge.

4. A clamp device in accordance with claim 1, including a lug projecting from said bridge and a lug projecting from said band adapted for engagement by a jawed tool for forcibly inserting the tongue through said bridge.

5. A clamp device for securing a flexible tubing to another more rigid tubular article comprising, a resilient band of sheet material adapted to be formed into a loop to encircle said tubing, a tongue with a plurality of teeth at one end of said band, a raised bridge at the other end of said band beneath which the teeth may pass upon insertion of the tongue through said bridge, said bridge being reversely bent adjacent one end to provide a resilient, generally U-shaped arm disposed to lie in generally the same circular surface as said band, and projection means extending upwardly from said arm and adapted to automatically spring into interlocking coacting engagement with selective of said teeth upon tightening of said band.

6. A clamp device for securing a flexible tubing to another more rigid tubular member comprising, a resilient sheet material band adapted to be telescopingly tightened around said tubing, a tongue of reduced transverse dimension compared to the transverse dimension of said band disposed adjacent one end of said band, a plurality of ratchet teeth projecting outwardly from said tongue, a raised bridge at the other end of said band beneath which the teeth may pass upon insertion of the tongue through said bridge, a resilient generally U-shaped arm carried by said bridge and diverging angularly outwardly from said bridge so as to lie in generally the same cylindrical surface of said band and adjacent the confronting peripheral surface of said tubing, projection means extending upwardly from the general plane of said arm for successive engagement with said teeth upon insertion of said tongue through said bridge, said projection means thereafter automatically pivoting inwardly into interlocking coacting engagement with selective of said teeth in the final telescopingly clamped position of said device.

7. A clamp device comprising, a strip of resilient material having a tongue at one end with teeth projecting therefrom, a bridge at the other end of said strip adapted to receive the tongue therethrough, said bridge including a resilient pawl means adapted to pivotally coact with selective of said teeth upon tightening of said device, said pawl means including a reversely bent arm spaced beneath said bridge, and the free end of said arm being bent upwardly to provide a flange for interlocking coacting engagement with selective of said teeth.

References Cited by the Examiner
UNITED STATES PATENTS

| | | | |
|---|---|---|---|
| 712,765 | 11/1902 | Cole | 24—20 |
| 1,176,181 | 3/1916 | Thomas | 40—304 |
| 1,705,895 | 3/1929 | Blair | 24—20 |
| 1,804,725 | 5/1931 | Walker | 24—20 |
| 2,318,816 | 5/1943 | Tinnerman | 24—20 |

WILLIAM FELDMAN, *Primary Examiner.*

DONALD A. GRIFFIN, *Examiner.*